United States Patent [19]

Cordner

[11] Patent Number: 4,858,493

[45] Date of Patent: Aug. 22, 1989

[54] MULTI-RANGE, DISSIPATIVE, INFINITELY VARIABLE RATIO TRANSMISSION

[75] Inventor: Michael A. Cordner, Manchester, Mo.

[73] Assignee: Sundstrand Corporation, Rockford, Ill.

[21] Appl. No.: 45,319

[22] Filed: May 4, 1987

[51] Int. Cl.⁴ .......................................... F16H 57/10
[52] U.S. Cl. ........................................ 74/768; 74/786
[58] Field of Search ............... 74/686, 768, 769, 786, 74/787; 192/58 C; 123/179 A, 179 AS, 179 B; 188/271; 318/11, 12, 13; 290/1 C

[56] References Cited

U.S. PATENT DOCUMENTS

| | | | |
|---|---|---|---|
| 2,293,050 | 8/1942 | De Pew | 74/768 |
| 2,402,951 | 7/1946 | De Pew | 74/768 |
| 2,618,175 | 11/1952 | Bruce | 74/768 |
| 2,862,406 | 12/1958 | Howell | 74/786 X |
| 2,990,503 | 6/1961 | Clark | 318/11 |
| 3,008,341 | 11/1961 | Cobb | 74/472 |
| 3,103,129 | 9/1963 | Egbert et al. | 74/472 |
| 3,159,052 | 12/1964 | O'Malley et al. | 74/645 |
| 3,182,759 | 5/1965 | Kelemen | 188/271 X |
| 3,234,822 | 2/1966 | Young | 74/791 |
| 3,311,200 | 3/1967 | Hayward | 188/90 |
| 3,511,113 | 5/1970 | Rheault | 74/794 |
| 3,886,816 | 6/1975 | De Feo et al. | 74/674 X |
| 3,912,060 | 10/1975 | Handke | 192/113 B |
| 4,114,477 | 9/1978 | Iverson | 74/768 |
| 4,184,386 | 1/1980 | Förster | 74/688 |
| 4,281,564 | 8/1981 | Hill | 74/665 |
| 4,480,728 | 11/1984 | Bailey et al. | 188/271 |
| 4,488,626 | 12/1984 | Handke | 192/58 C X |
| 4,708,030 | 11/1987 | Cordner | 74/686 |
| 4,721,014 | 1/1988 | Ohkubo | 74/768 X |

FOREIGN PATENT DOCUMENTS

| | | | |
|---|---|---|---|
| 621260 | 5/1961 | Canada | 318/11 |
| 1121388 | 8/1956 | France | 74/768 |
| 510500 | 8/1939 | United Kingdom | 74/768 |

OTHER PUBLICATIONS

Sundstrand Corporation letter of Apr. 3, 1981 and 14 pages of attachments thereto.

Primary Examiner—Dwight G. Diehl
Attorney, Agent, or Firm—Wood, Dalton, Philips, Mason & Rowe

[57] ABSTRACT

A multi-range, dissipative, infinitely variable ratio transmission has a planetary gearset with at least four distinct gear components including an input gear, an output gear and a pair of independently rotatable gears; a first hydroviscous brake connected to one of the rotatable gears; a second hydroviscous brake connected to the other of said rotatable gears; and a circuit including brake operating units for selecting which of said brakes is operable and for controlling the amount of slip of the operable brake in order to cover all combinations of input and output speed within their respective ranges with minimal slip of a hydroviscous brake to maximize efficiency of the transmission.

5 Claims, 2 Drawing Sheets

MULTI-RANGE, DISSIPATIVE, INFINITELY VARIABLE RATIO TRANSMISSION

DESCRIPTION

1. Field of the Invention

This invention relates to a multi-range, dissipative, infinitely variable ratio transmission operable to provide an infinitely variable speed ratio over a given range between a rotating power source and a rotating load. The infinitely variable ratio transmission has particular utility for use in systems where weight and size and minimal cost are important as in a drive for an aircraft cabin pressurization compressor where in the interest of cycle efficiency, it is desired to operate a compressor at a speed that is independent of an input speed to the transmission which is derived from a prime mover such as a propulsion engine of an aircraft.

BACKGROUND OF THE INVENTION

2.

Many different types of variable ratio transmissions are known for providing a variable speed ratio between a rotating power source and a rotating load. In a constant speed drive system, it is desired to drive a load such as a generator at constant speed from a variable speed prime mover such as a propulsion engine of an aircraft. The transmission can include a planetary gearset with selectively operable brakes and hydroviscous clutches to provide a constant output speed with variable input speed with minimal slipping of the hydroviscous clutches to minimize the dissipation of energy through the hydroviscous clutches.

Another known constant speed drive has a variable ratio transmission including a planetary gearset and a hydroviscous brake associated therewith to provide a constant speed output from the transmission with varying input speeds.

My copending application Ser. No. 713,879, filed Mar. 18, 1985 now U.S. Pat. No. 4,708,030, granted Nov. 24. 1987, discloses the use of a pair of hydroviscous clutches in association with a planetary gearset for a multi-range starter-generator drive.

A planetary gear transmission having a pair of brakes associated with different gears of the planetary gear transmission providing for either forward or reverse output rotation is shown in De Feo U.S. Pat. No. 3,886,816.

A transmission utilizing a hydroviscous clutch is shown in the Handke U.S. Pat. No. 4,488,626;

A drive train including a viscous clutch is shown in Renneker U.S. Pat. No. 4,562,897.

It is not known in the prior art to have a multi-range dissipative infinitely variable ratio transmission utilizing a planetary gearset having at least four rotatably associated gears with two of the gears defining input and output elements, respectively, and the other two gears being independently rotatable and associated one with each of a pair of hydroviscous brakes with means for selecting which of the brakes is operable and for controlling the slip thereof to provide a ground torque reaction and obtain the desired speed ratio with a minimum of dissipated energy through the slipping hydroviscous brake.

SUMMARY OF THE INVENTION

A primary feature of the invention is to provide a new and improved multi-range dissipative, infinitely variable ratio transmission which is of a relatively low cost construction and of minimal weight and size and which provides variable speed ratios over a given range between a rotating power source and a rotating load with maximum efficiency.

In carrying out the foregoing, the infinitely, variable ratio transmission embodies a gearset having at least four rotatably associated gears including an input gear, an output gear and a pair of independently rotatable gears; a first hydroviscous brake connected to one of said rotatable gears; a second hydroviscous brake connected to the other of said rotatable gears; and means for selecting which of said brakes is operable and controlling the amount of slip of the operating brake. More particularly, the gearset is a planetary gearset and there are a pair of brake operating units associated one with each of the hydroviscous brakes and responsive to a signal from a control circuit to either release or engage a brake and control the force of the engagement and resulting slip thereof.

An object of the invention is to provide a multi-range, dissipative, infinitely variable ratio transmission having a planetary gearset with at least four elements with two of the elements defining an input element and an output element and the other two defining ground elements with the ground elements operable one at a time to react torque through a dissipative hydroviscous brake associated with said element.

A further object of the invention is to provide an infinitely variable ratio transmission of the type set forth in the preceding paragraph with means for controlling the slip of each of the hydroviscous brakes over a small speed range to provide ground torque reaction over either a sequential or overlapping series of input or output speed ranges. With such structure, a speed range over which each brake has to slip is reduced and since dissipative energy is directly proportional to slip speed, higher efficiencies are obtained.

Still another object of the invention is to provide a infinitely variable ratio transmission as set forth in the preceding paragraph which is usable in an aircraft cabin pressurization compressor drive wherein in the interest of cycle efficiency, it is desired to operate the compressor at a speed that is independent of the input speed as derived from a main engine of an aircraft.

Still another object of the invention is to provide a multi-range, dissipative, infinitely variable ratio transmission comprising: an output shaft connectable to a load; a planetary gearset having at least four distinct operative elements including an input element connected to said input shaft, and output element connected to said output shaft, and a pair of rotatable elements rotatably interconnected with said input and output elements; a pair of hydroviscous brakes associated one with each of said rotatable elements; and means for controlling the alternate engagement of each of said brakes and the engaging force applied thereto to control the amount of slip of a brake.

A further object of the invention is to provide a multi-range, dissipative, infinitely variable ratio transmission in combination with an engine providing a drive input to the transmission and a compressor driven by the transmission comprising, a gearset with a plurality of rotatably associated gears including an input gear operatively connected to the engine, an output gear operatively connected to the compressor, and third and fourth gears, a first hydroviscous brake connected to the third gear, and a second hydroviscous brake connected to the fourth gear.

DESCRIPTION OF THE PREFERRED EMBODIMENT

Figure 1:
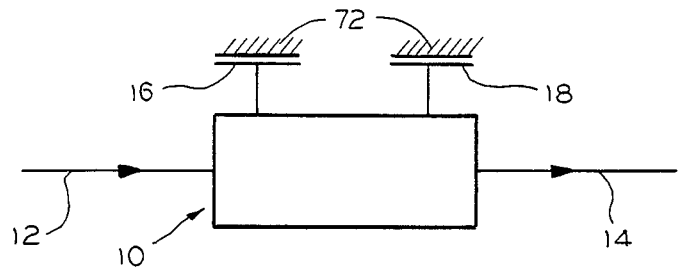
FIG. 1 is a diagrammatic view of the multi-range, infinitely variable ratio transmission.
Figure 2:
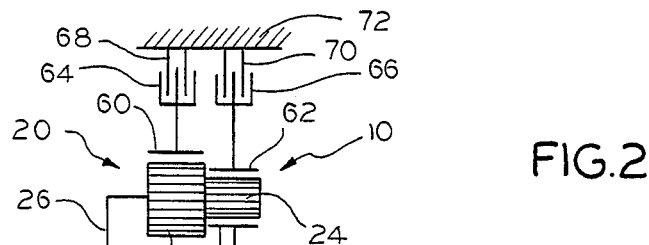
FIG. 2 is a schematic view of the variable ratio transmission.
Figure 5:
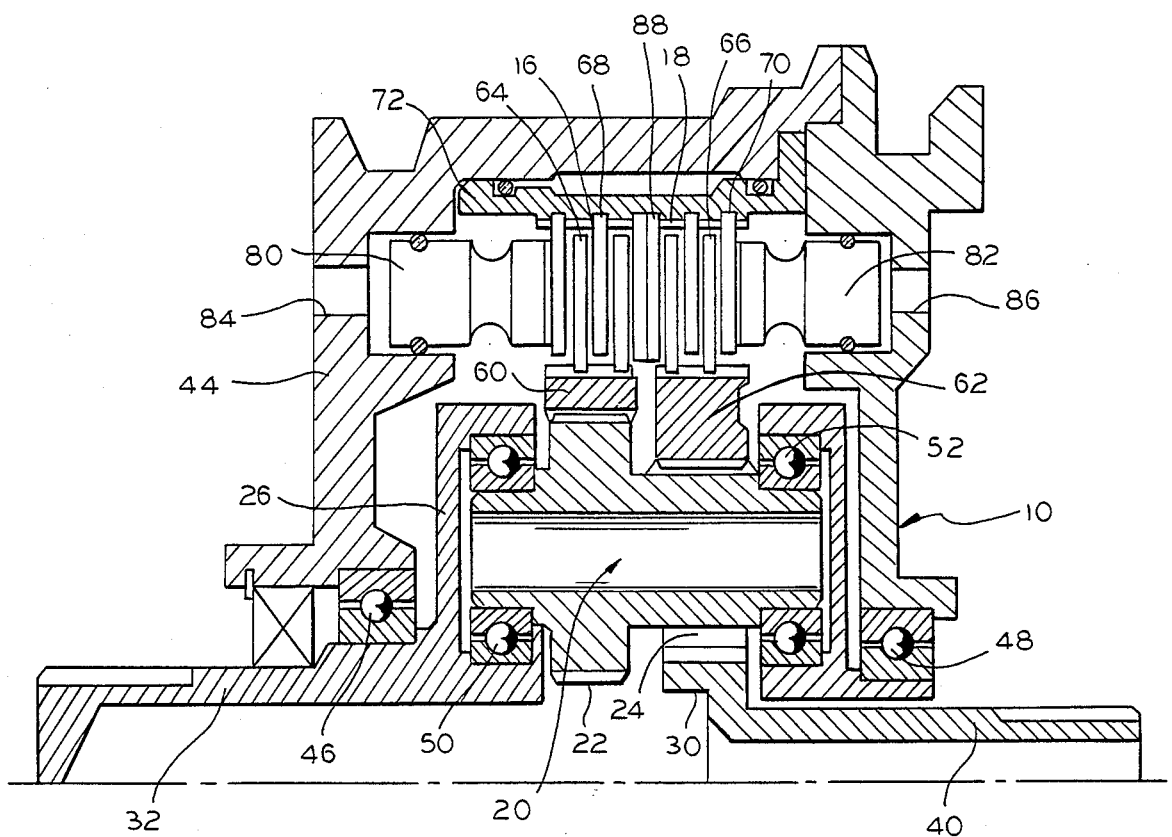
FIG. 5 is a fragmentary, vertical section of the variable ratio transmission.

The multi-range, dissipative, infinitely variable ratio transmission is shown in the diagrammatic view of FIG. 1, schematic view of FIG. 2 and the structural view of FIG. 5.

The variable ratio transmission has a gearset indicated generally at 10 which, as seen particularly in FIGS. 2 and 5, is a planetary gearset. The transmission has an input indicated by an arrow 12 with an output indicated by an arrow 14 and with the speed ratio between the input and output being determined by the operation of the planetary gear set 10 as controlled by a pair of hydroviscous brakes 16 and 18.

In the schematic view of FIG. 2, the planetary gearset is shown as having a compound planet gear indicated generally at 20 having planet gears 22 and 24 rotatable on a rotatable planet carrier 26. The planet carrier 26 mounts at least 3 of the compound planet gears 20 in equally spaced relation about a sun gear 30 which meshes with the planet gear 24.

An input shaft 32 is connected to the planet carrier 26 for the input drive indicated by the arrow 12 as derived from a prime mover such as the main propulsion engine 34 of an aircraft. The planet gear 22 defines an input element for the transmission. The sun gear 30 is fixed to or integral with an output shaft 40 (FIG. 5) for providing the output indicated by the arrow 14 for drive of a rotatable load such as an aircraft cabin pressurization compressor 42. As seen in FIG. 5, a housing 44 has a bearing 46 rotatably mounting the input shaft 32 and the planet carrier 26. A bearing 48 also rotatably supports the planet carrier in the housing and the planet carrier has a pair of bearings 50 and 52 rotatably mounting the compound planet gear 20.

The planetary gearset also has a pair of independently rotatable gears in the form of a pair of internally toothed annular ring gears 60 and 62 which mesh with the planet gears 22 and 24, respectively. The ring gears 60 and 62 are associated respectively with the hydroviscous brakes 16 and 18. Annular brake discs 64 and 66 are splined to the outer periphery of the respective ring gears 60 and 62 and interleaved brake plates 68 and 70 are grounded to a fixed part 72 of the housing by splined connections.

Suitable porting (not shown) provides for flow of oil between the elements 64, 66, 68 and 70 of the hydroviscous brakes in a manner known in the art.

Figure 3:
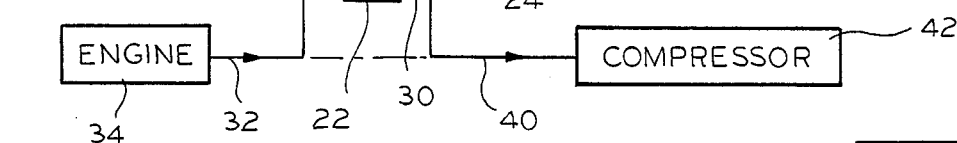
FIG. 3 is a schematic view of the control circuit for the hydroviscous brakes.

The control of engagement of the hydroviscous brake 16 is by control of a brake operating unit having three circumferentially spaced brake actuating pistons with one of the brake actuating pistons being identified at 80 in FIGS. 3 and 5. Similarly, for the hydroviscous brake 18 there are three equally spaced brake actuating pistons, with one of these brake actuating pistons being identified at 82 in FIGS. 3 and 5. As seen in FIG. 5, these brake actuating pistons are mounted in chambers defined within the housing 44 and have the respective ports 84 and 86 whereby control pressure can be applied to one or the other of the brake actuating pistons to cause engagement of a brake as resisted by plates 88 fixed to the housing part 72 and with the value of pressure determining the amount of slip between the elements of the brake.

A circuit for controlling operation of the brakes is shown in FIG. 3 with the disclosed embodiment being a hydraulic circuit.

A pump 90 pumps oil from a reservoir 92 through a filter 94 and a cooler 96 to a servo valve 98. The circuit includes a circuit relief valve 100 and part of the flow is delivered to the brakes for cooling thereof and to provide hydroviscous operation, as indicated at 102. The servo valve can be electrically controlled for setting a desired control pressure delivered to a transfer valve 104. The transfer valve is electrically operable to have two different positions and select whether the control pressure flow will be either through a line 106 to the brake operating unit having brake actuating pistons 80 or through a line 108 to the brake operating unit have the set of brake actuating pistons 82.

Figure 4:
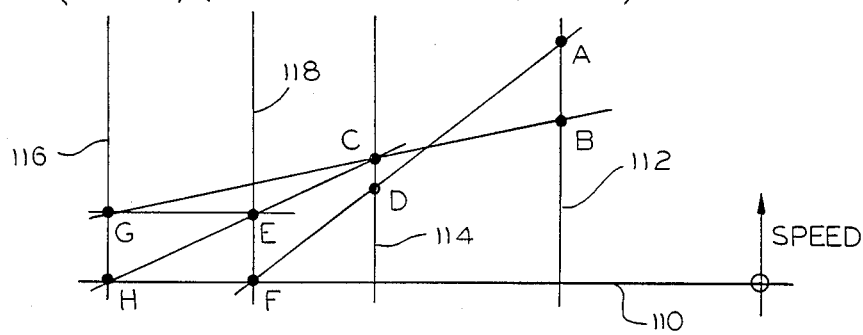
FIG. 4 is a speed nomograph.

A speed nomogram illustrating the operation appears in FIG. 4. With the variable ratio transmission, being used for aircraft cabin pressurization compressor drive, the components of the planetary gearset are sized to accommodate the required input and output speed values. In the speed nomogram, a zero speed line is indicated at 110. The output drive to the compressor 42 is indicated by a vertical line 112 and the desired range of speed of operation of the compressor falls between points A and B on the line 112. An input speed range for the engine 34 which will cause operation of the compressor is a speed range falling between the points C and D on a vertical speed line 114.

When either of the hydroviscous brakes 16 and 18 are completely grounded, there is no speed of the respective ring associated therewith and with this grounding indicated at point H on the line 110 for the ring 60 and point F on line 110 for the ring 62. The maximum slip speed for the hydroviscous brake 16 and thus the maximum speed for the ring 60 is shown at point G on a vertical speed line 116 and the maximum slip speed for the hydroviscous brake 18 and thus maximum speed for the ring 62 is shown at point E on a vertical speed line 118. From the speed nomogram, it will be seen that if the desired output speed is point A and the input speed is at point D, then the operation can be achieved by complete grounding of the hydroviscous brake 18 and the ring 62 so that the ring 62 does not rotate and is at zero speed as indicated at point F. In this operation the hydroviscous brake 16 is not engaged and ring 60 is free to rotate. If the input speed continues as indicated at point D and it is desired to operate the compressor at a speed indicated by point B, it will then be seen that operation can be by means of hydroviscous brake 16 being fully grounded and thus there being no speed of the ring 60 as indicated at point H. In this operation hydroviscous brake 18 is released and ring 62 is free to rotate.

Between the output speeds A and B for the compressor, it is possible to select which of the hydroviscous brakes will be operative dependent on the input speed and control the amount of slip thereof. As a further example, if the input speed is at point C and the desired output speed is as indicated by point A, it will be seen that a straight line between points A and C intersects speed line 118 intermediate points E and F and thus operation under these conditions requires a predetermined amount of slip of the hydroviscous brake 18.

From the foregoing, it will be evident that the infinitely variable ratio transmission embodies a planetary gear system with an input element, and output element and two or more ground elements as defined by the ring 60 and 62 operating one at a time to react torque through an associated dissipative hydroviscous brake. These brakes, or ground elements, can be "slipped" over a small speed range to provide ground torque reaction over a sequential or overlapping series of input or output speed ranges. By using multiple hydroviscous brakes as opposed to a single brake, the speed range over which each brake has to slip is reduced and since dissipative energy is directly proportional to slip speed, the lesser dissipation of energy results in obtaining of higher efficiencies. The two hydroviscous brakes cover all possible combinations of input and output speed within their respective ranges indicated by input speeds between point C and D and output speeds between points A and B.

I claim:

1. A multi-range, dissipative, infinitely variable ratio transmission comprising:
    a gearset having at least four rotatably associated gears including an input gear, an output gear and a pair of independently rotatable gears;
    a first hydroviscous brake connected to one of said rotatable gears and operable to vary speed of the output gear within a first range;
    a second hydroviscous brake connected to the other of said rotatable gears and operable to vary speed of the output gear within a second range,
    said first and second ranges being at least partially overlapping; and
    means for selecting which of said brakes is operable and controlling the amount of slip of the operating brake.

2. A multi-range, dissipative, infinitely variable ratio transmission comprising:
    a planetary gearset having a sun gear, a compound planet gear, and a pair of ring gears;
    an input shaft connectable to an engine and connected to said compound planet gear;
    an output shaft operatively connected to said sun gear and connectable to a compressor;
    a first hydroviscous brake connected to one of said ring gears and operable to vary speed to the output gear within a first range, a second hydroviscous brake connected to the other of said ring gears and operable to vary speed of the output gear within a second range, and means for selecting which hydroviscous brake shall operate and for controlling the amount of slip of the operating brake said first and second ranges being at least partially overlapping.

3. A multi-range, dissipative, infintitely variable ratio transmission as defined in claim 2 wherein said selecting means is a hydraulic circuit having a pair of brake operating units, a transfer valve for selecting which brake operating unit is connected to a source of pressure, and a servo valve for setting the value of said pressure.

4. A multi-range, dissipative, infinitely variable ratio transmission with variable ratio within each range comprising: a gearset having at least four rotatably-associated gears including an input gear, an output gear and a pair of independently rotatable gears arranged for alternate operation to provide different ratios of speed of the output gear relative to the input gear; a first hydroviscous brake connected to one of said independently rotatable gears and responsive to the value of a fluid control pressure to either lock-up, permit free rotation or slip to permit retarded rotation of said one independently rotatable gear and cause operation of said output gear in a first speed range when locked-up or slipping; a second hydroviscous brake connected to the other of said independently rotatable gears and responsive to the value of a fluid control pressure to either lock-up, permit free rotation or slip to permit retarded rotation of said other independently rotatable gear and cause operation of said output gear in a second speed range when locked-up or slipping; and a hydraulic circuit including both of said hydroviscous brakes, a transfer valve for connecting a source of fluid control pressure to one or the other of said hydroviscous brakes, and a servo valve for controlling the value of said fluid control pressure delivered to a hydroviscous brake through the transfer value, said first and second speed ranges being at least partially overlapping.

5. A multi-range, dissipative, infinitely variable ratio transmission for receiving a variable drive input from an engine and driving a compressor with variable ratio drive of the compressor within each range comprising: a gearset having at least four rotatably-associated gears including an input compound planet gear, an output sun gear and a pair of independently rotatable ring gears arranged for alternate operation to provide different ratios of speed of the output sun gear relative to the input compound planet gear; a first hydroviscous brake connected to one of said independently rotatable ring gears and responsive to the value of a fluid control pressure to either lock-up, permit free rotation or slip to permit retarded rotation of said one independently rotatable ring gear and cause operation of said output gear in a first speed range when locked-up or slipping; a second hydroviscous brake connected to the other of said independently rotatable ring gears and responsive to the value of a fluid control pressure to either lock-up, permit free rotation or slip to permit retarded rotation of said other independently rotatable ring gear and cause operation of said output gear in a second speed range when locked-up or slipping; and a hydraulic circuit including both of said hydroviscous brakes, a transfer value for connecting a source of fluid control pressure to one or the other of said hydroviscous brakes, and a servo value for controlling the value of said fluid control pressure delivered to a hydroviscous brake through the transfer valve, said first and second speed ranges being at least partially overlapping.

* * * * *